Jan. 10, 1950 H. T. WILHELM 2,494,499
BRIDGE NETWORK
Filed July 24, 1945 2 Sheets-Sheet 1

INVENTOR
H.T. WILHELM
BY
Walter M. Hill
ATTORNEY

Jan. 10, 1950    H. T. WILHELM    2,494,499
BRIDGE NETWORK

Filed July 24, 1945      2 Sheets-Sheet 2

$z_x = R_x + j\omega L_x$
$R_x = \dfrac{(RC)}{C_s}$
$L_x = (RC) R_s$

INVENTOR
H. T. WILHELM
BY
*Walter M. Will*
ATTORNEY

Patented Jan. 10, 1950

2,494,499

UNITED STATES PATENT OFFICE 2,494,499

BRIDGE NETWORK

Henry T. Wilhelm, Long Island City, N. Y., assignor to Bell Telephone Laboratories, Incorporated, New York, N. Y., a corporation of New York Application July 24, 1945, Serial No. 606,805

4 Claims. (Cl. 323—75)

This invention relates to electric bridge networks and more particularly to a compensating or neutralizing network therefor which neutralizes the unwanted capacitance in the high resistance arms of the bridge.

One of the principal difficulties encountered in extending the range of some of the alternating current bridges, as for example the Maxwell and Owen bridges, has been due to the phase unbalance produced by an unwanted stray capacitance appearing effectively across a high resistance arm of the bridge. For relatively low resistance values these resistances tend to appear inductive but for the higher resistance values as, for example, from about 1000 ohms upwards, these resistances gradually become more and more capacitive thereby introducing a capacitance unbalance in the bridge network. It has heretofore been the custom to either work within the limitations imposed or compensate or neutralize this unwanted capacitance by means of an inductance. This inductance, however, introduces at least two difficulties which militate rather strongly against its more extensive use. The first difficulty is that such an inductance invariably introduces additional resistance or conductance into the bridge network which in turn must be taken into account and balanced out. The second difficulty is that inductances invariably introduce magnetic pick-up in the bridge network which is very difficult, if not at times almost impossible, to completely eliminate by any reasonable amount of shielding. In addition to these two difficulties it may also be pointed out that inductive reactances suitable for such compensation are often very large, expensive and cumbersome and are consequently also undesirable for these reasons.

It is the object of this invention to provide a relatively simple and inexpensive compensating or neutralizing network of small dimensions and which is substantially free of the difficulties and objections outlined above.

The foregoing object is attained by this invention by providing a neutralizing network for an alternating current bridge having a plurality of terminals and a resistance arm between two of its terminals which has an inherent undesirable capacitance requiring compensation, said neutralizing network comprising a neutralizing admittance connected to a third terminal of said bridge and to a point on said resistance arm.

The invention may be better understood by referring to the accompanying drawings in which:

Fig. 1 discloses a well-known form of Maxwell bridge to illustrate the invention and is herein specifically disclosed as having an undesirable capacitance between its A–D terminals;

Fig. 2 discloses schematically a means for compensating this undesired capacitance in accordance with the principles of this invention;

Figs. 3, 4 and 5 are explanatory of the compensating principles of this invention as applied to Fig. 2;

Fig. 6 discloses the effective admittances introduced by the compensating network of this invention into a bridge circuit of the type shown in Fig. 1;

Figure 1:
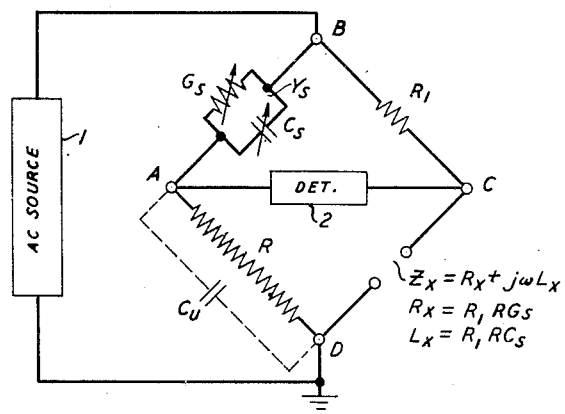

Referring now more particularly to Fig. 1 wherein is shown a familiar type of Maxwell bridge. This bridge is shown with four terminals A, B, C and D, respectively. The alternating current source 1 is connected to the B and D terminals respectively, the latter being preferably grounded as indicated schematically in the figure. Across the A and C terminals there is connected the conventional detector 2 used for detecting the condition of balance. This type of bridge is commonly used for measuring the components of an inductive impedance directly in terms of the product of the two resistance arms and the two components of the standard admittance Ys. As shown in Fig. 1 the unknown impedance Zx is connected between the D and C terminals of the bridge while the standard admittance Ys comprising a conductance Gs and capacitance Cs is connected between the A and B terminals. A resistor $R_1$ is connected between the B and C terminals while a resistor R of relatively higher resistance is connected between the A and D terminals. This latter resistor is assumed to have an appreciable stray or distributed capacitance schematically illustrated as of magnitude $C_U$. It is this latter undesired capacitance which causes errors in balancing and the compensation of this undesired capacitance in the bridge network is the problem to which this invention is directed.

Figure 2:
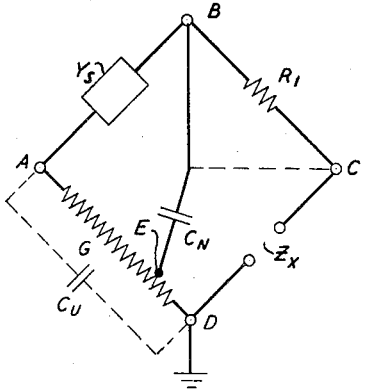

Referring now to Fig. 2 it will be noted that the bridge network is substantially identical to that shown in Fig. 1. The power source 1 and detector 2, as shown in Fig. 1, have been deleted from Fig. 2 as well as in all succeeding figures to simplify the drawings and the description thereof. As is well known these two elements, the power source and the detector, may be interchanged at will between the two pairs of terminals shown in these figures.

Fig. 2, however, shows an additional network in accordance with this invention which compensates the undesirable capacitance $C_U$ appearing between the A and D terminals of the bridge. This network comprises simply a neutralizing capacitor $C_N$ connected with its lower terminal to a point E in the conductance G (the reciprocal of the high resistance R of Fig. 1). The upper terminal of this capacitor $C_N$ may be connected to either the B or C terminals of the bridge network. This is schematically illustrated in Fig. 2 by showing a solid line connection between the B terminal of the bridge to the upper terminal of the neutralizing capacitor $C_N$ and a dotted line connecting the upper terminal of the capacitor to the C terminal of the bridge network. This indicates, of course, an alternative connection. That this network compensates or neutralizes the undesirable capacitance $C_U$ is not particularly obvious but will be explained more in detail in connection with Figs. 3, 4 and 5. The effect of this neutralizing capacitance $C_N$ may be thought of as introducing an effective negative capacitance across the A—D arms of the bridge which annuls or neutralizes the effect of the undesired stray capacitance $C_U$. With the introduction of this neutralizing capacitance $C_N$ the several admittances effectively across the A—D terminals of the bridge include the combination of the conductance G, the unwanted stray capacitance $C_U$ and the effect of the neutralizing capacitor $C_N$. When properly neutralized this combination may be made a substantially pure conductance.

Figure 3:
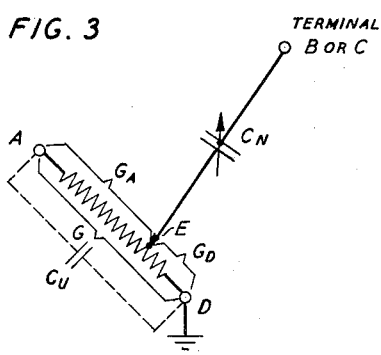
Figure 4:
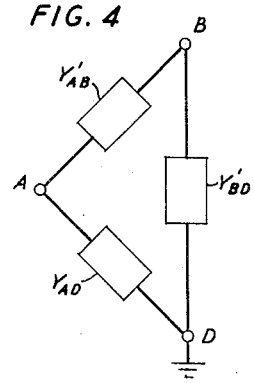

In order to determine this total effective admittance between the A and D terminals of the bridge the pertinent circuit elements of Fig. 2 may be extracted as shown in Fig. 3. In Fig. 3 the portion of the total conductance G between the terminal A and the point E is denoted $G_A$, while the remaining portion of the conductance between the point E and the D terminal is denoted $G_D$. The upper terminal of the neutralizing capacitor $C_N$ may be connected to either the B or the C terminal. If connected to the B terminal the equivalent circuit of the network shown in Fig. 3 would appear as in Fig. 4 wherein the network comprising conductances $G_A$ and $G_D$ and the neutralizing capacitor $C_N$ has been transformed into its equivalent delta or mesh network as shown in Fig. 4. The total admittance across the A and D terminals is denoted in Fig. 4 as $Y_{AD}$. This is the total admittance including the undesired capacitance $C_U$. The magnitude of this admittance may be expressed mathematically as follows using the admittance transformation equations well known in the art which transform the admittances of a star network to its equivalent delta or mesh network:

$$Y_{AD} = \frac{G_A G_D}{G_A + G_D + j\omega C_N} + j\omega C_U \qquad (1)$$

The admittance $Y'_{AB}$ is the additional admittance thrown across the A and B terminals of the bridge due to the connection of the neutralizing capacitor $C_N$ between the B terminal and point E on the conductance G. The magnitude of this admittance may be expressed as follows:

$$Y'_{AB} = \frac{j\omega C_N G_A}{G_A + G_D + j\omega C_N} \doteq j\omega \left(\frac{C_N G_A}{G_A + G_D}\right) \qquad (2)$$

Likewise the admittance across the diagonal from terminal B to terminal D is expressed as follows:

$$Y'_{BD} = \frac{j\omega C_N G_D}{G_A + G_D + j\omega C_N} \doteq j\omega \left(\frac{C_N G_D}{G_A + G_D}\right) \qquad (3)$$

The approximations given in Equations 2 and 3 are valid when $\omega C_N \ll (G_A + G_D)$. It must be understood that the undesired capacitance $C_U$ is not included in these last two equations since it does not form a part of the star network comprising conductances $G_A$ and $G_D$ and capacitance $C_N$. Referring again to Fig. 4 it will be noted that the admittance $Y'_{AB}$ shown across the A—B arm of the bridge is an additional admittance thrown in parallel with the standard admittance $Y_S$ shown in Fig. 2. This parallel relationship is shown more clearly in Fig. 6 which is equivalent to Fig. 2. This admittance is ordinarily substantially capacitive as indicated by the approximation given in Equation 2 and is of relatively small magnitude. Consequently it can be easily tolerated as part of the residual capacitance of the standard arm. The admittance $Y'_{BD}$ appearing across the B—D diagonal of the bridge is obviously across either the detector or the power source depending upon which is connected across this diagonal of the bridge and consequently it also is very easily tolerated. In any event it causes no unbalance effect in the bridge itself.

Figure 5:
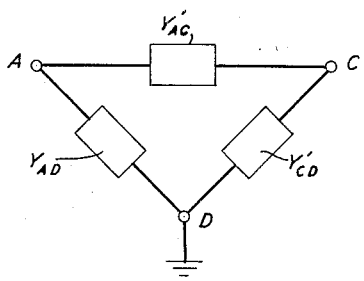

In Fig. 5 the total admittance appearing across the A—B arm is again shown as being $Y_{AD}$. The value of this admittance is the same as given by equation 1 for Fig. 4. The value of the other two admittances $Y'_{AC}$ and $Y'_{CD}$ are obtained by using the admittance transformation equations previously mentioned. The admittance across the A—C diagonal causes no effect on the bridge balance since it appears either across the detector or the power source, whichever is connected to these terminals. The additional admittance $Y'_{CD}$ is thrown across the unknown impedance. This is ordinarily less desirable than the arrangement shown in Fig. 4. However, under certain conditions this admittance may be made so small as to have no appreciable effect on the value of the impedance being measured. This is particularly true where the point E on the conductance shown in Fig. 3 is chosen relatively close to the A corner of the bridge.

It will thus be seen that when the neutralizing capacitor $C_N$ is connected to the B terminal of the bridge, both the A—B and the A—D arms of the bridge are affected, whereas if the upper terminal of the neutralizing condenser is connected to the C terminal of the bridge both the A—D and the C—D arms are affected. The effect on the A—D arm is the same in both cases. Which connection should be employed depends upon the various parameters of the bridge and the particular range of impedances to be measured. Ordinarily, however, the connection to the terminal B is somewhat preferred. For the purposes of the remainder of the description in connection with the Maxwell type bridge as shown in Fig. 1, it will be assumed that the connection is made to terminal B, it being understood that the considerations are substantially identical when the connection is made to the terminal C.

Figure 6:
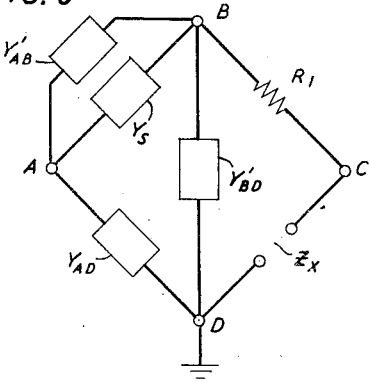

When the neutralizing capacitor $C_N$ is connected between the B corner of the bridge and the point E as shown in Fig. 2, and these admittances are transformed into their equivalent mesh networks so that their values are defined by Equations 1, 2 and 3 above, the final equivalent of the bridge network may be shown by the schematic in Fig. 6. Now in order for the undesired capacitance to be neutralized, it is necessary that the admittance $Y_{AD}$ between the A and D corners of the bridge be made a pure conductance.

It has been discovered that the usual conductance G available for this purpose is inherently not exactly constant with frequency but tends to increase somewhat as a function of frequency. As a first-order approximation, however, it may be assumed constant for the present to serve as a basis for a quantitative consideration of the relationship between the neutralizing capacitance $C_N$ and the rest of the admittance parameters in the A—D arm. The conductance G, thus assumed constant, may be taken as equal to the admittance $Y_{AD}$ as expressed in Equation 1, for in the ideal case it is desired that the A—D arm be a pure conductance equal to G. Actually, the neutralizing capacitor $C_N$, while completely neutralizing the undesired capacitance $C_U$, causes the over-all conductance in the A—D arm to decrease slightly with frequency as is evident from simplifying Equation 1 and separating its components as follows:

$$Y_{AD} = \left[ \frac{(G_A + G_D) G_A G_D}{(G_A + G_D)^2 + \omega^2 C_N^2} \right] + j\omega \left[ C_U - \frac{G_A G_D C_N}{(G_A + G_D)^2 + \omega^2 C_N^2} \right]$$

$$= \left[ \frac{G}{1 + \frac{\omega^2 C_N^2}{(G_A + G_D)^2}} \right] + j\omega \left[ C_U - \frac{G_A G_D C_N}{(G_A + G_D)^2 + \omega^2 C_N^2} \right] \quad (1A)$$

It should be noted that the conductance term in Equation 1A contains a frequency term in its denominator which causes the over-all conductance to decrease somewhat with frequency. Although this effect is negligible at lower frequencies where the bridge is usually used, it tends to extend the useful frequency range of the bridge because it offsets part of the above described inherent increase of the conductance G with frequency.

It may also be noted that for most practical bridges used at the lower frequencies, the frequency term in the denominator becomes negligible so that the conductance closely approximates the conductance G.

The important point to note is that the introduction of the neutralizing capacitor $C_N$ not only substantially eliminates the effect of the undesired capacitance $C_U$ but also improves somewhat the frequency characteristic of the conductance component.

With the above considerations in mind, conductance G may be substituted for the admittance $Y_{AD}$ in Equation 1 and after simplifying, the following is obtained:

$$G_A = \frac{2G}{1 \pm \sqrt{1 - \frac{4C_U}{C_N}}} \quad (4)$$

In arriving at the approximate expression given above, the following relation was taken into account:

$$\omega \ll \frac{G}{C_U} \quad (5)$$

Figure 8:
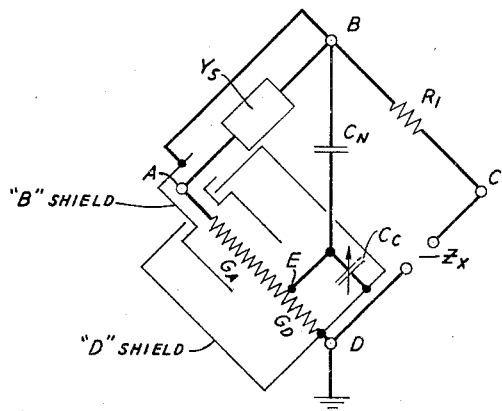
Fig. 8 is a schematic of a bridge network of the type shown in Fig. 1 to which the principles of this invention have been applied and which also shows a preferred type of shielding for the high resistance arm of the bridge.

In constructing a bridge in accordance with the principles of this invention as thus far explained, the Maxwell bridge components are set up as shown schematically in Fig. 1 with all of the shielding customarily used in such bridges in place. The shielding has not been shown in Fig. 1 but should be included in the bridge in accordance with well established shielding principles. It is preferred that the A—D arm of the bridge be shielded as indicated in Fig. 8 although other shielding methods may be used. With the bridge thus constructed the stray capacitance shunting the A—D arm herein denoted $C_U$ is determined by suitable laboratory methods. A value for the neutralizing capacitor $C_N$ may then be selected which must, of course, be equal to or greater than four times the value of the undesired capacitance $C_U$ just determined. This value of the neutralizing capacitance must be selected in order to obtain a real solution from expression 4. If less than this value is selected an incomplete compensation will be realized.

The value for the conductance from the A corner of the bridge to the point E, which is equal to $G_A$, is then calculated from Equation 4. It will be noted that two real solutions are actually possible. If the upper end of the neutralizing capacitor $C_N$ is connected to the B terminal of the bridge it is preferred that the positive sign be used before the radical in expression 4. On the other hand, if the upper end of the neutralizing capacitor $C_N$ is connected to the C terminal of the bridge, it is preferred that the negative sign be used before the radical in expression 4. This will provide values of conductance $G_A$ such that the minimum amount of added admittance is thrown across the A—B or C—D arms of the bridge by the neutralizing network. If a value of neutralizing capacitance $C_N$ be selected equal to four times the undesired stray capacitance $C_U$ the conductance $G_A$ will obviously be equal to twice the total conductance G between the A and D terminals of the bridge. This means that point E for this limiting condition will be at the mid-point of conductance G.

It is sometimes desirable to first select a fixed value of conductance $G_A$ in terms of the total conductance G. For example, point E may be selected so that the conductance $G_D$ is equal to K times the total conductance G. In this case the conductance $G_A$ will be equal to $KG/(K-1)$. Substituting this value of $G_A$ in expression 4 and solving for $C_N$ yields the following expression:

$$C_N = \frac{K^2 C_U}{K-1} \quad (6)$$

It will thus be seen that in order to neutralize the undesired capacitance $C_U$ appearing in the A—D arm of the bridge it is only necessary to connect the neutralizing capacitor from a third terminal of the bridge to a point in the resistance (or conductance) of the A—D arm. Having determined the magnitude of the undesired capacitance and having selected a point along the conductance G to which to connect one terminal of the neutralizing capacitor, it is only necessary to compute the magnitude of the neutralizing capacitor from expression 6 above. In the particular case where the point E is selected such that K=10, the neutralizing capacitance $C_N$ is $100 C_U/9$.

Figure 7:
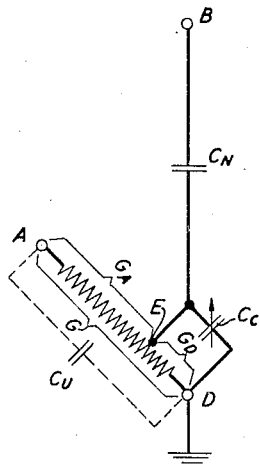
Fig. 7 shows a simple means of adjusting the compensating network of Fig. 2.

As a practical matter it is impossible to calculate the value of a circuit element going into a sensitive bridge as, for example, the neutralizing capacitor $C_N$ as herein described, and expect the calculated value to be exactly right. This is primarily due to the fact that these new elements also have undetermined stray admittances to affect the balance of the bridge. It is, therefore, desirable to allow some adjustment for the capacitance $C_N$. This may either be done directly by making $C_N$ adjustable or it may be accomplished indirectly by the use of an additional correcting capacitance $C_C$ as shown in Fig. 7. Either method is operative but for practical convenience the indirect method of Fig. 7 has the advantage that the movable element can be kept at ground potential.

Referring now to Fig. 7 it will be noted that the A—D arm of the bridge contains a conductance G assumed to have an appreciable stray capacitance $C_U$ of undesired magnitude across the A and D terminals of the bridge. To compensate for this capacitance in the manner already described for Figs. 1 to 6, inclusive, a neutralizing capacitor $C_N$ is connected between the B terminal of the bridge and point E on the conductance. In order to adjust the effect of this neutralizing capacitance $C_N$ a correcting capacitance $C_C$ is connected between the point E and the D terminal of the bridge. To use such a capacitance it is necessary that the neutralizing capacitor $C_N$ be just a little larger than expressed by Equation 6. The rational means for determining the size of this neutralizing capacitor $C_N$ will be described in greater particularity later.

Applying the same kind of analysis to the network of Fig. 7 as was previously applied to the network of Fig. 3 the following expression for the admittance between the A and D terminals of the bridge may be written:

$$Y_{AD} = \frac{G_A(G_D + j\omega C_C)}{G_A + G_D + j\omega C_C + j\omega C_N} + j\omega C_U \quad (7)$$

As before, complete compensation for the A—D arm of the bridge is assumed when the admittance $Y_{AD}$ appearing thereacross and as expressed by Equation 7 above is equal to the conductance G of this arm. Therefore substituting the conductance G for the admittance $Y_{AD}$ in Equation 7 and solving for the neutralizing capacitance $C_N$ yields the following expression:

$$C_N = \frac{\left[\frac{G^2 C_U K^2}{K-1} + C_C\left(\frac{G^2}{K-1} - \omega^2 C_U^2\right)\right] + \frac{j\omega C_U G K}{K-1}[C_U K + C_C]}{\omega^2 C_U^2 + G^2} \quad (8)$$

where $K = G_D/G$.

The above Equation 8 applies generally to the network shown in Fig. 7. In making practical use of this expression it is desirable to fix some of the circuit parameters with respect to others. It will be noted in Fig. 7 that point E is selected as a fixed point along the conductance G. For example, this point may be selected such that conductance $G_D$ is equal to K times the conductance G between the terminals A and D. It necessarily follows then that the conductance $G_A$ is equal to $G_D/(K-1)$. Making these substitutions in Equation 8 and observing the following relationship:

$$\omega^2 \ll \frac{G^2}{C_U^2(K-1)} \quad (9)$$

Equation 8 may be rewritten in the following simplified form:

$$C_N \doteq \frac{1}{K-1}\left([C_U K^2 + C_C] + \frac{j\omega C_U K}{G}[C_U K + C_C]\right) \quad (10)$$

The imaginary part of Equation 10 is negligible compared with the real part and the capacitor $C_N$ can be physically realized as a pure capacitance when:

$$\omega \ll \frac{G}{C_U K}\left[\frac{C_U K^2 + C_C}{C_U K + C_C}\right] \quad (11)$$

The real part of Equation 10 is, therefore:

$$C_N \doteq \frac{C_U K^2 + C_C}{K-1} \quad (12)$$

Equation 12 provides a rational basis for determining the size of the neutralizing capacitor for the bridge of Fig. 7 and gives a value slightly larger than given by Equation 6. Since $C_C$ merely provides a correction or adjustment for the compensating network, it should not be larger than about 20 per cent of $C_U K^2$, i. e., $C_C$ is not greater than $C_U K^2/5$.

It is often convenient for many Maxwell bridges to make $K=10$. This corresponds with the particular position assumed for point E in Fig. 3 when discussing Equation 6. For this particular case $$C_N \doteq \frac{100 C_U + C_C}{9} \quad (13)$$

The requirements of expressions 9 and 11 must also be kept in mind and satisfied. Fortunately, this is usually easily done for any bridge requiring this kind of neutralization. When the requirements of expressions 9 and 11 are met, the value of the neutralizing capacitor $C_N$ and the correcting capacitor $C_C$ may be mutually adjusted to satisfy Equation 12 or 13.

It is obvious that there is considerable freedom as to the order of procedure in designing a bridge in accordance with the principles of this invention. One procedure, similar to that previously described, is to assemble the bridge with all its shielding including that shown in Fig. 8 but without the neutralizing capacitor $C_N$ or the adjusting capacitance $C_C$. The type of shielding shown in Fig. 8 is suggested for the high resistance arm of a Maxwell type bridge, although other types of shielding may be used. In any event, after the shielding is in place the undesired capacitance $C_U$ appearing across the A and D terminals of the bridge is determined by suitable laboratory procedures. A suitable point E should be selected. If this point E is selected such that the conductance $G_D$ is equal to 10 times the conductance $G(K=10)$, Equation 13 may be used. If, on the other hand, a different point is selected, reference will have to be made to Equation 12.

The design procedure just outlined is obviously only one of many which may be employed in view of the relatively large number of circuit parameters available. In each case, however, in accordance with the principles of this invention the undesired capacitance of $C_U$ appearing across a high resistance arm of the bridge is compensated by means of a neutralizing capacitor connected from a third terminal of the bridge to a point on this high resistance network and if this capacitance is proportioned properly in accordance with the principles of this invention, it will neutralize the effect of this undesired capacitance in this arm.

Figure 9:
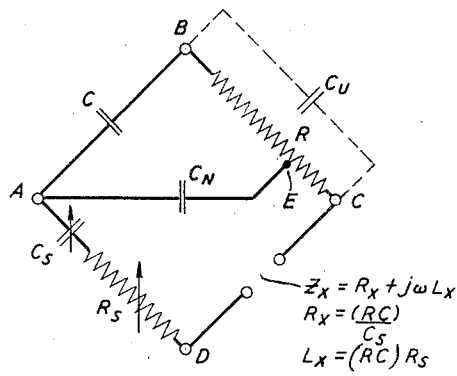
Fig. 9 shows the invention applied to the high resistance arm in a bridge of the Owen type.

The application of this invention is not limited to the Maxwell type bridge but may be used on most any type of alternating current bridge in which a high resistance arm contains an undesired stray capacitance thereacross. Another example of an alternating current bridge is shown in Fig. 9. This bridge is of the Owen type. In this figure the circuit elements having the same functions as those in the previous figure bear the same reference characters. This bridge need not be described in detail since it is of a well-known type. Also, since the principles of compensating the undesired capacitance $C_U$ appearing across a high resistance arm of the bridge have already been described in considerable detail with respect to the Maxwell bridge, it need only be mentioned that the same principles are applied in compensating this capacitance in the Owen type bridge.

What is claimed is:

1. A neutralizing network for an alternating current bridge, said bridge having a plurality of terminals and a resistance arm between two of its terminals which has an inherent undesired shunt capacitance requiring compensation, said neutralizing network comprising a neutralizing admittance connected to a third terminal of said bridge and to a fixed point on said resistance arm, the location of said point along said resistance arm and the size of said neutralizing admittance being so selected that the network formed by said neutralizing admittance and the resistance shunted by the undesired capacitance substantially eliminates the effect of the undesired capacitance.

2. A neutralizing network for an alternating current bridge, said bridge having four terminals and a resistance arm between two of its terminals which has an inherent undesired shunt capacitance requiring compensation, said neutralizing network comprising a neutralizing admittance connected to a third terminal of said bridge and to a fixed point on said resistance arm, the resistance between said point being less to the terminal opposite from said third terminal than to the terminal adjacent to said third terminal, the location of said point along said resistance arm and the size of said neutralizing admittance being so selected that the network formed by said neutralizing admittance and the resistance shunted by the undesired capacitance substantially eliminates the effect of the undesired capacitance.

3. A neutralizing network for an alternating current bridge, said bridge having a plurality of terminals and a resistance arm between two of its terminals which has an inherent undesired shunt capacitance requiring compensation, said neutralizing network comprising a neutralizing admittance connected to a third terminal of said bridge and to a fixed point on said resistance arm, and an additional adjusting admittance connected between said point and one of said two bridge terminals, the location of said point along said resistance arm and the size of said neutralizing admittance being so selected that the network formed by said neutralizing admittance and the resistance shunted by the undesired capacitance substantially eliminates the effect of the undesired capacitance.

4. A neutralizing network for an alternating current bridge, said bridge having four terminals and a resistance arm between two of its terminals which has an inherent undesired shunt capacitance requiring compensation, said neutralizing network comprising a neutralizing admittance connected to a third terminal of said bridge and to a fixed point on said resistance arm, the resistance between said points being less to the terminal opposite from said third terminal than to the terminal adjacent to said third terminal, and an additional adjusting admittance connected between said point and one of said two bridge terminals, the location of said point along said resistance arm and the size of said neutralizing admittance being so selected that the network formed by said neutralizing admittance and the resistance shunted by the undesired capacitance substantially eliminates the effect of the undesired capacitance.

HENRY T. WILHELM.

REFERENCES CITED

Publication entitled "Alternating Current Bridge Methods," by B. Hague, fourth edition, published 1938, by Pitman Publishing Co. of New York.